United States Patent
Rittenhouse, Jr. et al.

(10) Patent No.: US 11,873,852 B2
(45) Date of Patent: Jan. 16, 2024

(54) ADJUSTABLE LATCH SYSTEMS AND METHODS

(71) Applicant: THE BOEING COMPANY, Chicago, IL (US)

(72) Inventors: Timothy D. Rittenhouse, Jr., Summerville, SC (US); Todd Schackman, Ladson, SC (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 17/511,698

(22) Filed: Oct. 27, 2021

(65) Prior Publication Data
US 2023/0130210 A1    Apr. 27, 2023

(51) Int. Cl.
*F16B 2/02*     (2006.01)
*B64D 11/00*    (2006.01)

(52) U.S. Cl.
CPC ............... *F16B 2/02* (2013.01); *B64D 11/00* (2013.01)

(58) Field of Classification Search
CPC .................................. F16B 2/02; B64D 11/00
See application file for complete search history.

(56) References Cited

U.S. PATENT DOCUMENTS

| | | | | |
|---|---|---|---|---|
| 3,837,606 A * | 9/1974 | Hikai | .......................... | E04G 5/04 248/242 |
| 3,840,095 A * | 10/1974 | Matson | ..................... | F16B 2/02 188/42 |
| 4,487,413 A * | 12/1984 | Fall | ........................... | F16B 9/05 482/23 |
| 4,575,295 A * | 3/1986 | Rebentisch | ........... | F16B 37/046 411/85 |
| 5,154,385 A * | 10/1992 | Lindberg | ............. | A47B 57/562 248/245 |
| 7,070,374 B2 * | 7/2006 | Womack | ............... | B60P 7/0815 410/104 |
| 7,320,446 B2 * | 1/2008 | Saint-Jalmes | ...... | B64D 11/0641 244/118.6 |
| 7,713,009 B2 * | 5/2010 | Hudson | .............. | B64D 11/0696 410/104 |
| 7,874,774 B2 * | 1/2011 | Peterson | ............... | B60P 7/0815 410/104 |

(Continued)

FOREIGN PATENT DOCUMENTS

JP   2011067525   4/2011

OTHER PUBLICATIONS

Extended European Search Report for EP 22203791.3-1004, dated Mar. 6, 2023.

(Continued)

*Primary Examiner* — Victor D Batson
*Assistant Examiner* — Matthew J Sullivan
(74) *Attorney, Agent, or Firm* — Joseph M. Butscher; The Small Patent Law Group LLC

(57) ABSTRACT

A latch system and method are configured to adjustably secure a first component to a second component. The latch system includes a mounting base. A slide plate is moveably coupled to the mounting base. The slide plate is configured to be slidably adjusted relative to the mounting base. A housing is secured to the slide plate. The housing includes an arm channel configured to receive a latch arm.

21 Claims, 9 Drawing Sheets

(56) References Cited

U.S. PATENT DOCUMENTS

| | | | | |
|---|---|---|---|---|
| 8,191,829 | B2* | 6/2012 | Erickson | B64D 11/00 244/118.5 |
| 8,277,158 | B2* | 10/2012 | Csik | F16B 37/046 411/111 |
| 9,316,606 | B2* | 4/2016 | Umlauft | B64D 11/00 |
| 9,546,000 | B2* | 1/2017 | Shih | B64D 11/0696 |
| 9,789,965 | B2* | 10/2017 | Benthien | B64D 11/0696 |
| 10,053,204 | B2* | 8/2018 | King | B64D 11/00 |
| 10,130,178 | B1* | 11/2018 | Landes | A47B 57/54 |
| 10,179,638 | B2* | 1/2019 | King | B64D 11/00 |
| 10,493,895 | B2* | 12/2019 | Lamoureux | F16B 21/02 |
| 10,589,863 | B2* | 3/2020 | Maclay | B64D 11/00 |
| 10,737,788 | B2 | 8/2020 | Slyter et al. | |
| 10,759,538 | B2* | 9/2020 | Danet | B64D 11/0696 |
| 10,919,632 | B2* | 2/2021 | Minyard | B64D 11/003 |
| 11,274,786 | B2* | 3/2022 | Liao | F16B 2/065 |
| 11,560,918 | B2* | 1/2023 | Sbongk | F16B 37/0842 |
| 2007/0075213 | A1* | 4/2007 | Foser | E04C 2/428 248/216.1 |
| 2007/0138821 | A1* | 6/2007 | Mejuhas | B64D 11/0696 244/118.6 |
| 2011/0309195 | A1* | 12/2011 | Bishop | B64D 11/0696 244/118.6 |
| 2012/0217368 | A1* | 8/2012 | Zunino | B64C 1/20 410/105 |
| 2014/0064827 | A1* | 3/2014 | Korenromp | F16B 2/06 403/63 |
| 2014/0151503 | A1* | 6/2014 | De La Fuente Carnero | A61G 3/0866 244/118.6 |
| 2016/0167786 | A1 | 6/2016 | Maclay | |
| 2023/0130210 | A1* | 4/2023 | Rittenhouse, Jr. | F16B 2/02 24/457 |

OTHER PUBLICATIONS

Anonymous: "1", Feb. 20, 2023 (Feb. 20, 2023), pp. 1-2, XP093025739, Retrieved from the Internet: UR.L: Anonymous [retrieved on Feb. 20, 2023].

Anonymous: "Rollmayer Glossy Single-Track Curtain Rail Made from Aluminium, Ceiling Mounting with Smart-Click Assembly, Inner Rail for Curtains (TS) Amazon. de: Rome & Kitchen", Oct. 5, 2018 (Oct. 5, 2018), pp. 1-9, XP093025746, Retrieved from the Internet: URL:https://www.amazon.de/Rollmayer-Gardin-enschiene-Faltenlegehaken-Deckenbefestigung-Innenlaufschiene/dp/B077B9VM57/ref=asc_df B077B9VM57/?tag=6linkCode=df0&hvadid=345B64D 0487604836hvpos=6hvnetw=g&hvrand=117741900.

Aimg developer: "Commercial Fire-stopping—Costly Mistakes ; TFP", Apr. 29, 2021 (Apr. 28, 2021), pp. 1-1, 7 093025781, Retrieved from the Internet: URL:https://www.tfpi.com/blog/avoid-thesecostly-common-firestopping-mistakes/ [retrieved on Feb. 21, 2023].

* cited by examiner

ADJUSTABLE LATCH SYSTEMS AND METHODS

FIELD OF THE DISCLOSURE

Examples of the present disclosure generally relate to latch systems, and more particularly to adjustable latch systems configured to adjustably couple components together.

BACKGROUND

Commercial aircraft typically include an internal cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Each passenger section may be separated from an adjacent passenger section by a cabin transition area, which may include one or more monuments, such as walls, work stations, or the like. Curtains may be used to separate sections of an aircraft for a variety of reasons, including class separation, privacy, work areas, and the like. For example, a cabin transition area between a business class section and a coach section may include a curtain assembly within an aisle. A curtain moveably connected to a curtain track that spans over any aisle may be selectively opened and closed. When opened, such as during a boarding process, passengers may pass from one section to another section, such as from the business class section to the coach section. During flight, the curtain may be closed to indicate that passengers are not allowed to pass (or at least discouraged from passing) from the coach section into the business class section.

During flights, lights within one passenger section may be on, while lights within an adjacent passenger section may be off. Some aircraft include a header over a curtain section that is configured to limit or shade light between sections. A known header includes a panel formed of a solid material. The solid header typically straddles onto an upper curtain track of the curtain in a linear fashion. For example, the solid header may straddle either side of a curtain track and be secured thereto. Another known header is configured to block or otherwise limit passage of light over curtain assemblies within an interior cabin of an aircraft. The header is sturdy, robust, and aesthetically agreeable in that it may contour and blend with inboard or outboard structures (such as through smooth, arcuate transitions).

Typically, a header is secured to another structure, such as a portion of a bin assembly, a portion of an environmental control system, a monument, and/or the like by a plurality of latches, which are fixed in position relative to the header. However, known latches constrain the position of the header position. Once the header is installed, there is typically no ability to adjust the position of the header. As such, if an individual finds that the header is too far away or too close to another structure after installation, the header typically needs to be removed from the other structure, and the latches themselves need to be removed and/or reworked in relation to the header.

SUMMARY OF THE DISCLOSURE

A need exists for an adjustable latch system. Further, a need exists for a latch system that is configured to latchably secure a first component to a second component and for adjustment of the first component in relation to the second component after the first component is latchably secured to the first component. Also, a need exists for a latch system that allows an individual to adjust a header without removing the header or preforming additional rework.

With those needs in mind, certain examples of the present disclosure provide a latch system configured to adjustably secure a first component to a second component. The latch system includes a mounting base. A slide plate is moveably coupled to the mounting base. The slide plate is configured to be slidably adjusted relative to the mounting base. A housing is secured to the slide plate. The housing includes an arm channel configured to receive and retain a latch arm.

In at least one example, the first component is a header assembly within an internal cabin of a vehicle. The second component is a structure that latchably secures to the header assembly through the latch system. The mounting base of the latch system is securely fixed to one of the header assembly or the structure.

In at least one example, the slide plate includes one or more adjustment tracks configured to removably couple to one or more reciprocal adjustment tracks of the mounting base. For example, the one or more adjustment tracks of the slide plate include a first adjustment track and a second adjustment track configured to removably couple to the one or more reciprocal adjustment tracks of the mounting base. In at least one further example, the first adjustment track is offset with respect to the second adjustment track. In at least one example, the slide plate is configured to be removed from the mounting base, rotated about an axis to a different radial position relative to the mounting base, and re-inserted into the mounting base at the different radial position.

In at least one example, a spring member is disposed between the mounting base and the slide plate. The spring member exerts a spring force between the mounting base and the slide plate. In at least one further example, the mounting base includes an adjustment channel. The slide plate and the spring member are disposed within the adjustment channel.

In at least one example, a release lever is pivotally coupled to the housing. The release lever is configured to pivot between a securing position, in which the latch arm is securely trapped within the arm channel, and a release position, in which the latch arm is removable from the arm channel. As a further example, the release lever has a length that is at least 1.5 inches.

In at least one example, the latch system is configured to be adjusted by urging the mounting base upwardly in relation to the slide plate, and sliding the mounting base in relation to the slide plate while the mounting base is urged upwardly in relation to the slide plate.

Certain examples of the present disclosure provide a latch method configured to adjustably secure a first component to a second component. The latch method includes retaining a latch arm within an arm channel of a housing secured to a slide plate that is moveably coupled to a mounting base; and slidably adjusting the slide plate relative to the mounting base.

Certain examples of the present disclosure provide a vehicle including an internal cabin, a first component within the internal cabin, a second component within the internal cabin, and a latch system that adjustably secures the first component to the second component, as described herein.

DETAILED DESCRIPTION OF THE DISCLOSURE

Figure 1:
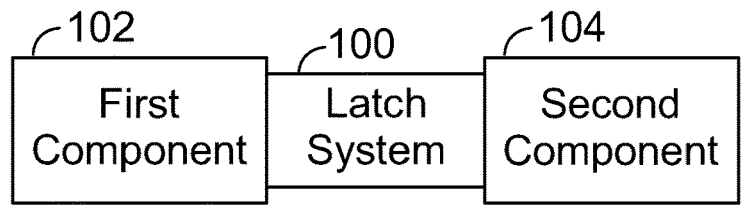
FIG. 1 illustrates a schematic block diagram of a latch system that latchably secures a first component to a second component, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide a latch system that allows an individual to adjust a first component (such as a header) in relation to a second component (such as a portion of a valence, a bin assembly, a portion of an environment control system, a portion of a monument, or the like) without removing the first component from the second component, or preforming additional rework. For example, if the gap between a header and a valance is out of tolerance, an individual can push up on the header, and slide the light header inboard or outboard to achieve a desired spacing between the header and the valence.

In at least one example, the latch system allows an individual installing a header (for example, a light limiting header) to adjust an inboard/outboard location of the header by simply pushing up on the header and sliding the header inboard or outboard, as desired. The latch system allows for the header to be adjusted in relation to another component (such as a valence, overhead stowage bin assembly, monument, or the like) without removing the header from the other component. As such, the latch system provides for efficient and effective installation and manufacturing, thereby reducing labor time and costs.

Certain examples of the present disclosure provide an adjustable latch system for adjusting a gap between adjacent panels or other structures. The latch system includes an adjustable slide plate, a housing mount, and a compliant spring member. In at least one example, the latch system can provide at least ½ inch of total linear adjustable movement, can move in ⅛ inch or 1/16 inch increments. In operation, and when assembled, an individual can push upwardly on a header panel, which releases the adjustable slide plate from the housing mount to facilitate lateral sliding of the header (relative to an adjacent panel), and then release pressure from the header, which automatically locks the adjustable slide plate to the housing mount (due to gravity and friction and locking of teeth or pins on the slide plate to slots on the housing). The compliant spring member applies pressure between the slide plate and the housing to prevent accidental unlocking of the latch due to turbulence induced vibrations. The latch system and method of adjustment facilitate blind adjustment capability by an individual, which is advantageous because prior known solutions require manual adjustment of the latch and/or removal panels to facilitate micro adjustments.

FIG. 1 illustrates a schematic block diagram of a latch system 100 that latchably secures a first component 102 to a second component 104, according to an example of the present disclosure. The latch system 100 can be adjustably secured to the first component 102. The latch system 100 latchably secures to a reciprocal structure secured to the second component 104. Optionally, the latch system 100 can be adjustably secured to the second component 104, and the reciprocal structure can be secured to the first component 104. It is to be understood that the terms first and second are merely to identify the number of component. The first component can be the second component, and vice versa.

In at least one embodiment, the latch system 100 includes a base surface that is parallel with a surface of a floor, ground, or the like. As such, the latch system 100 can be horizontally oriented. As another example, the latch system 100 can be orthogonal to the surface of the floor, ground, or the like. Accordingly, the latch system 100 can be vertically oriented. As another example, the latch system 100 can be oriented at any angle between a horizontal orientation and a vertical orientation.

The first component 102 and the second component 104 can be structures within an internal cabin of a vehicle, such as a commercial aircraft. As one example, the first component 102 is a header. The second component 104 can be a portion of an overhead bin assembly. As another example, the second component 104 can be a portion of an environmental control system. As another example, the second component 104 can be a monument within an internal cabin, such as a portion of a lavatory, a closet, a galley section, and/or the like.

Optionally, the latch system 100 can be used with various components whether or not within an internal cabin. For example, the first component 102 can be a first portion of a barrier, such as a fence, and the second component 104 can be a second portion of the barrier, a gate, or the like. It is to be understood that examples of the first component 102 and the second component 104 are provided, but the latch system 100 can be used with respect to various other components that are configured to be securely latched together.

As described herein, after the first component 102 is latchably secured to the second component 104 by the latch system 100, the latch system 100 can be moveably adjusted to provide adjustment between the first component 102 and the second component 104. As such, the first component 102 can be adjusted relative to the second component 104, via the latch system 100, without the first component 102 being disconnected or otherwise removed from the second component 104.

Figure 2:
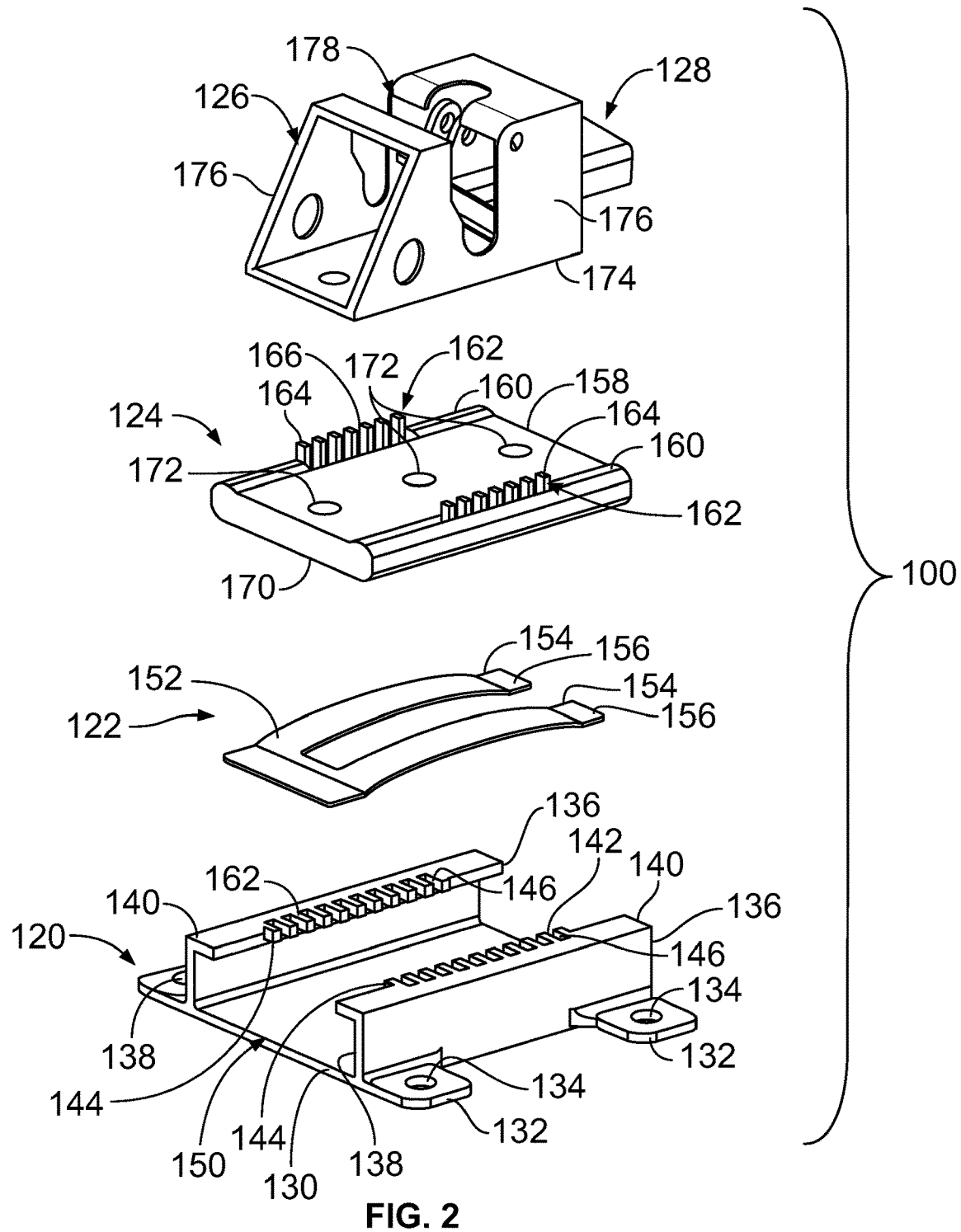
FIG. 2 illustrates an isometric exploded view of a latch system, according to an example of the present disclosure.

FIG. 2 illustrates an isometric exploded view of the latch system 100, according to an example of the present disclosure. The latch system 100 includes a mounting base 120, a spring member 122, a moveable slide plate 124, a housing 126, and a release lever 128 pivotally coupled to the housing 126.

The mounting base 120 includes a panel 130, which can be a flat, planar sheet. The panel 130 can include tabs 132 having through holes 134 that are configured to receive fasteners, such as screws, bolts, or the like. The panel 130 is configured to be fixedly secured to a structure, such as a surface of the first component 102 (or optionally, the second component 104), shown in FIG. 1. Opposed rails 136 upwardly extend from the panel 130. The opposed rails 136 are spaced apart from one another. Each rail 136 includes an extension wall 138 extending from the panel 130. An orthogonal cross ledge 140 angles inwardly from a top edge of the extension wall 138. The cross ledges 140 of the opposed rails 136 are directed toward one another. The cross ledge 140 can be perpendicular to the extension wall 138.

Each of the cross ledges 140 includes an adjustment track 142. The adjustment track 142 includes an alternating series of teeth 144 (for example, pins, peaks, posts, or the like) and retainers 146, such as recesses or openings. Optionally, only one of the cross ledges 140 may include an adjustment track 142.

An adjustment channel 150 is defined between the panel 130 and the rails 136. The spring member 122 is disposed within the adjustment channel 150.

In at least one example, the spring member 122 includes a cross strap 152 and arcuate, bowed legs 154 longitudinally extending from the cross strap 152. The legs 154 connect to distal feet 156. The cross strap 152 and the feet 156 are configured to abut against the panel 130 within the adjustment channel 150, while the legs 154 upwardly bow above the panel 130. The spring member 122 provides a spring force that is exerted between the panel 130 and the slide plate 124. Optionally, the spring member 122 can be sized, shaped, and configured differently than shown. For example, the spring member 122 can be or include one or more metal coil sections. Alternatively, the latch system 100 may not include the spring member 122.

The slide plate 124 includes a planar main body 158 and lateral ridges 160 extending upwardly from either side of the main body 158. Adjustment tracks 162 upwardly extend from the lateral ridges 160. Like the cross ledges 140 of the mounting base 120, the adjustment tracks 162 include an alternating series of teeth 164 and retainers 166, such as recesses or openings. Optionally, only one of the ridges 160 may include an adjustment track 162.

The slide plate 124 is moveably secured within the adjustment channel 150. The spring member 122 is disposed between the panel 130 and an underside 170 of the slide plate 124. The spring member 122 exerts a spring force between the panel 130 and the slide plate 124, thereby urging the adjustment tracks 162 of the slide plate 124 into the adjustment tracks 142 of the mounting base 120. The teeth 164 of the adjustment tracks 162 of the slide plate 124 are retained within the retainers 146 of the adjustment tracks 142 (and the teeth 144 of the adjustment tracks 142 are retained within the retainers 166 of the adjustment tracks 162) to securely lock the slide plate 124 in position relative to the mounting base 120.

The housing 126 secures onto the slide plate 124. For example, the slide plate 124 can include one or more through holes 172 that are configured to receive one or more fasteners that secure a base 174 of the housing 126 to the slide plate 124. Optionally, the slide plate 124 may not be secured to the housing 126 through fasteners. Instead, the slide plate 124 can be fixed to the panel 130 through adhesives, for example. As another example, the slide plate 124 can be integrally formed with the housing 126. For example, the slide plate 124 can form part of the base 174 of the housing 126.

The housing 126 includes a plurality of walls 176 upwardly extending from the base 174. An arm channel 178 is formed between and/or through one or more of the walls 176. The arm channel 178 is configured to latchably retain a latch arm of a reciprocal structure, as is known. The release lever 128 pivotally couples to the housing 126. The release lever 128 is configured to pivot between a securing position, in which the latch arm is securely trapped within the arm channel 178, and a release position, in which the latch arm can be removed from the arm channel 178.

Referring to FIGS. 1 and 2, as described herein, examples of the present disclosure provide the latch system 100 configured to adjustably secure the first component 102 to the second component 104. The latch system 100 includes the mounting base 120. The slide plate 124 is moveably coupled to the mounting base 120. The slide plate 124 is configured to be slidably adjusted relative to the mounting base 120. The housing 126 secured to the slide plate 124. The housing 126 includes the arm channel 178 configured to receive and retain a latch arm therein.

Figure 3:
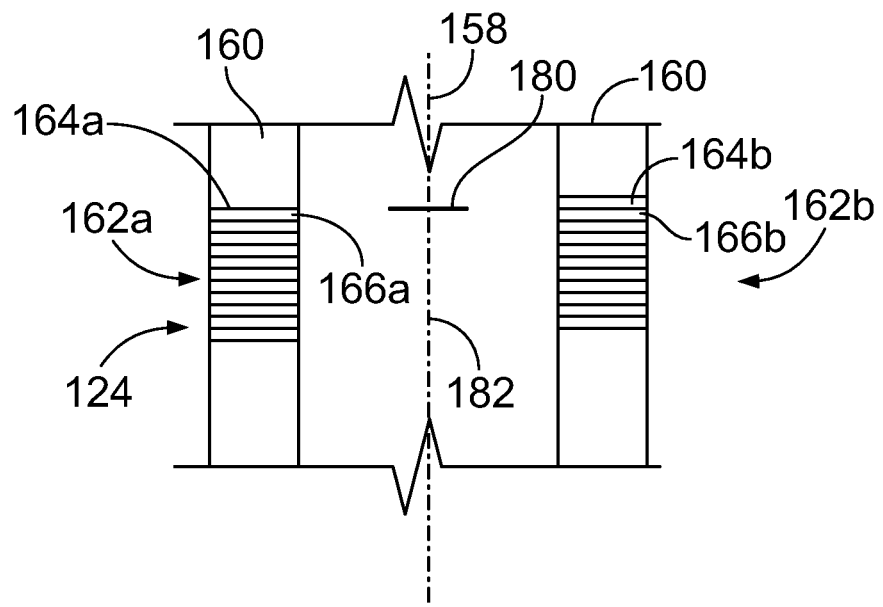
FIG. 3 illustrates a top view of a slide plate, according to an example of the present disclosure.

FIG. 3 illustrates a top view of the slide plate 124, according to an example of the present disclosure. As shown, the adjustment tracks 162a and 162b on opposite ridges 160 can be offset with respect to one another. That is, teeth 164a of the adjustment track 162a are laterally aligned with retainers 166b of the adjustment track 162b. Similarly, teeth 164b of the adjustment track 162b are laterally aligned with retainers 166a of the adjustment track 162a. Laterally aligned refers to being within a common plane 180 that is at a right angle with a longitudinal plane 182 of the slide plate 124, for example. The adjustment tracks 142 of the mounting base 120 are similarly offset from one another.

Referring to FIGS. 2 and 3, the teeth 144 of the adjustment tracks 142 can be spaced apart a particular desired distance, such as ⅛ inch. Similarly, the teeth 164 of the adjustment tracks 162 can be spaced the same distance. By offsetting the tracks 162a and 164a (and the tracks 142 of the mounting base), the slide plate 124 can be removed from the mounting base 120, and rotated 180 degrees, in order to provide finer adjustment, such as distances of 1/16 inch.

In at least one embodiment, the slide plate 124 includes a first adjustment track 162a and a second adjustment track 162b that are configured to couple to one or more reciprocal adjustment tracks 142 of the mounting base 120. In at least one example, the first adjustment track 162a is offset with respect to the second adjustment track 162b.

Alternatively, the adjustment tracks 162a and 162b may not be offset with respect to one another. Instead, the adjustment tracks 162a and 162b can be axially aligned with respect to one another. The dual adjustment tracks 162a and 162b mated with the reciprocal adjustment tracks 142 of the mounting base 120 provide increased retaining strength, whether or not they are offset with respect to one another. Also, alternatively, the slide plate 124 may include only one adjustment track 162 that is configured to mate with a single adjustment track 142 of the mounting base 120.

Figure 4:
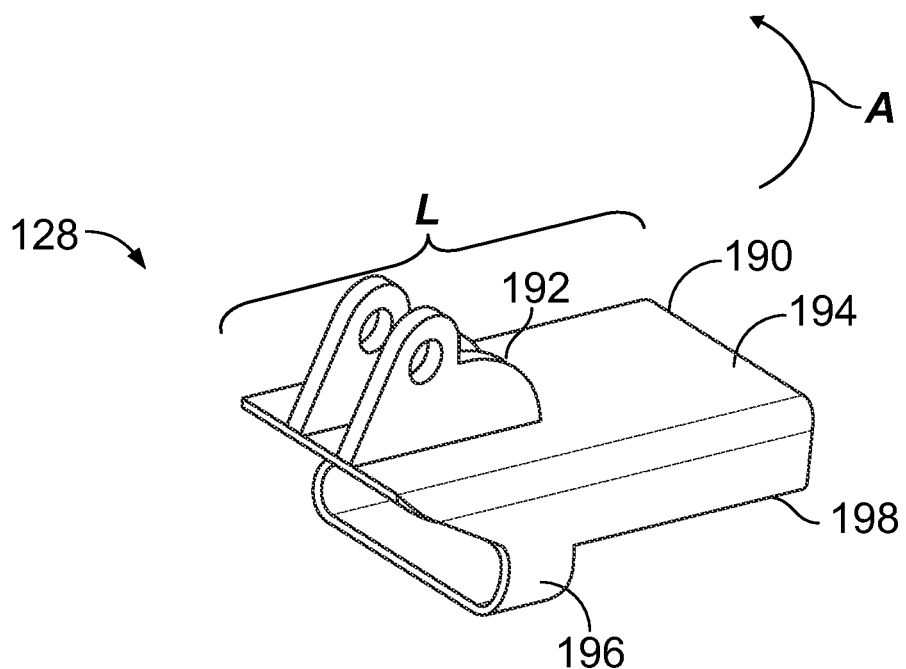
FIG. 4 illustrates an isometric view of a release lever, according to an example of the present disclosure.

FIG. 4 illustrates an isometric view of the release lever 128, according to an example of the present disclosure. The release lever 128 includes a beam 190 having pivot fins 192 upwardly extending from a top surface 194, and an arm cuff 196 downwardly extending from a bottom surface 198.

Referring to FIGS. 2 and 4, the pivot fin 192 are pivotally coupled to the housing 126, such as through a pin. In this manner, the release lever 128 is configured to pivot in relation to the housing 126. In the securing position, a portion of a latch arm (such as a distal tip) is retained between the beam 190 within the arm cuff 196. In order to release the latch arm. The beam 190 is urged upwardly in the direction of arc A, thereby causing the release lever 128 to rotate, and release the portion of the latch arm from the arm cuff 196.

The length L of the release lever 128 is longer than prior known release lever. For example, a length of a prior known release lever is less than 1¼ inches (1.25 inches). However, the length L of the release lever 128 can be ¼-½ inches (0.25 inches-0.5 inches) longer than the length of the prior known release lever. For example, the length L can be 1½-1¾ inches (1.5-1.75 inches). The greater length L allows for engagement of the release lever 128 over an adjustment range of the latch system 100 (shown in FIGS. 1 and 2). Optionally, the length L can be less than 1.5 inches or greater than 1.75 inches.

Figure 5:
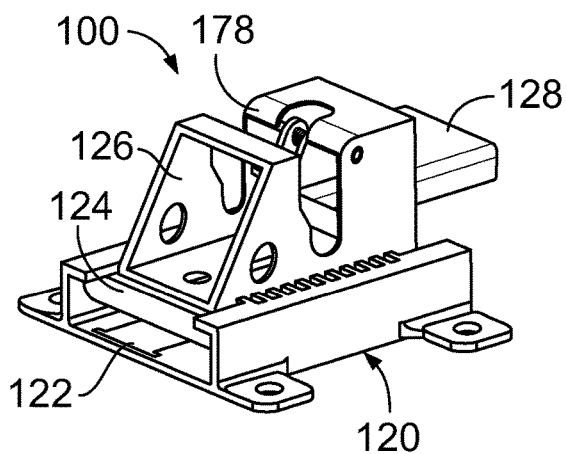
FIG. 5 illustrates an isometric view of the latch system.

FIG. 5 illustrates an isometric view of the latch system 100. Referring to FIGS. 1-5, the mounting base 120 is fixed to the first component 102. A latch arm secured to the second component 104 is latchably secured within the arm channel 178 of the housing 126. The spring member 122 exerts a spring force between the slide plate 124 and the mounting base 120, thereby securing the adjustment track(s) 162 of the slide plate 124 to the adjustment track(s) 142 of the mounting base 120 (for example, the teeth 164 of the adjustment track(s) 162 are trapped within the retainers 146 of the adjustment track(s) 142).

Figure 6:
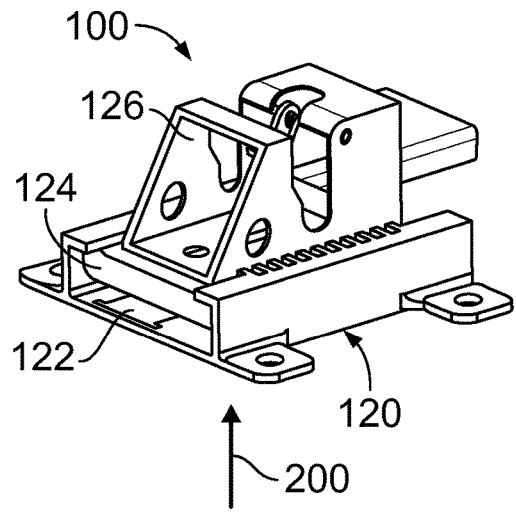
FIG. 6 illustrates an isometric view of the latch system being initially moved, according to an example of the present disclosure.

FIG. 6 illustrates an isometric view of the latch system 100 being initially moved, according to an example of the present disclosure. Referring to FIGS. 1-6, in order to linearly adjust the latch system 100, the first component 102 is urged in the direction of arrow 200 (such as in an upward direction). As the first component 102 is moved in the direction of arrow 200, the mounting base 120 moves in response thereto (as the mounting base 120 is fixed to the first component 102. In response, the spring member 122 is flattened, and the slide plate 124 remains in position, as it is underneath the housing 126, which is latchably coupled to the latch arm fixed in position in relation to the second component 104. Accordingly, the adjustment track(s) 162 of the slide plate 124 disengage from the adjustment track(s) 142 of the mounting base 120. As shown in FIG. 6, as the mounting base 120 is pushed up, the spring member 122 compresses, thereby disengaging the adjustment track(s) 162 of the slide plate from the adjustment track(s) 142 of the mounting base 120.

Figure 7:
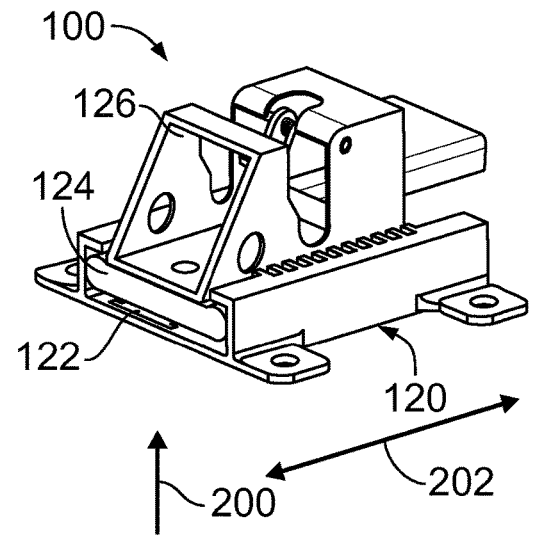
FIG. 7 illustrates an isometric of the latch system being adjusted, as desired.

FIG. 7 illustrates an isometric of the latch system 100 being adjusted, as desired. Referring to FIGS. 1-7, with the force in the direction of arrow 200 being applied, such that the adjustment track(s) 162 are no longer locked in place with respect to the adjustment track(s) 142 of the mounting base 120, the mounting base 120 (and the first component 102) can be linearly adjusted in the directions of arrow 202, as the slide plate 124 can be slid relative to the housing base 120. Adjustment in the directions of arrow 202 occurs while the force is exerted in the direction of arrow 200 so that the adjustment track(s) 162 remain disengaged from the adjustment track(s) 142 until a desired position is released. The mounting base 120 can be slid back and forth in the directions of arrow 202, while the upward force in the direction of arrow 200 is maintained.

At the desired position, the force in the direction of arrow 200 is removed, and the adjustment track(s) 142 re-seat onto the adjustment track(s) 162, such that the teeth 164 of the adjustment track(s) 162 lock into reciprocal retainers 146 of the adjustment track(s) 142, thereby locking the mounting base 120 in position relative to the slide plate 124 (and the housing 126 secured to the slide plate 124). The spring member 122 exerts a spring force between the mounting base 120 and the slide plate 124 so that the adjustment track(s) 162 are not inadvertently dislodged from the adjustment track(s) 142 (such as, for example, during periods of turbulence experienced by an aircraft). Alternatively, the latch system 100 may not include the spring member 122.

Figure 8:
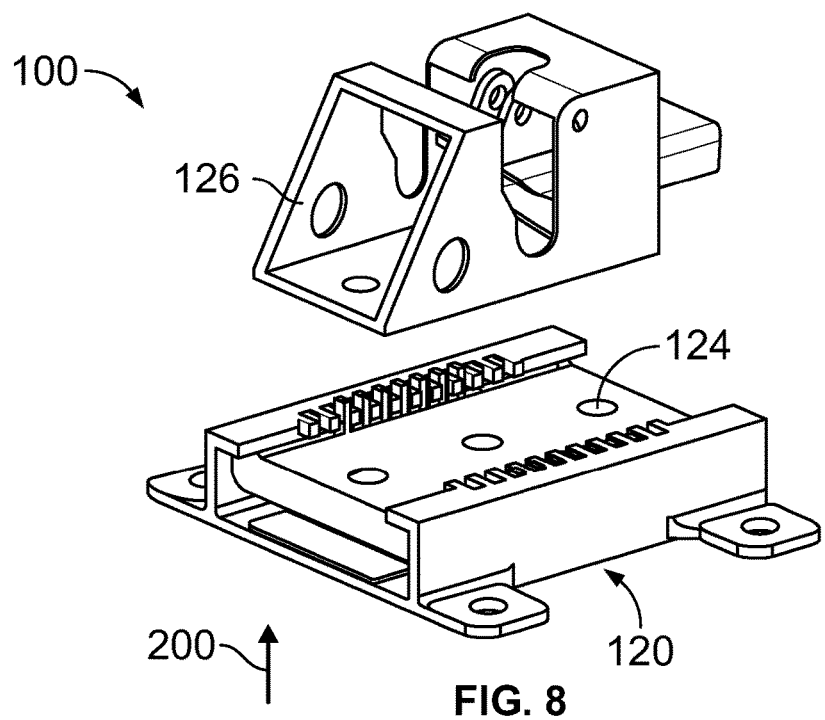
FIG. 8 illustrates an isometric view of a housing removed from a slide plate, according to an embodiment of the present disclosure.

FIG. 8 illustrates an isometric view of the housing 126 removed from the slide plate 124, according to an embodiment of the present disclosure. As noted, the housing 126 can be secured to the slide plate 124 through one or more fasteners. Referring to FIGS. 1-8, in order to provide finer adjustment of the mounting base 120 relative to the slide plate 124, the housing 126 can first be removed from the slide plate 124. The mounting base 120 can then be urged relative to the slide plate 124 in the direction of arrow 200, thereby disengaging the adjustment tracks 162 from the adjustment tracks 142.

Figure 9:
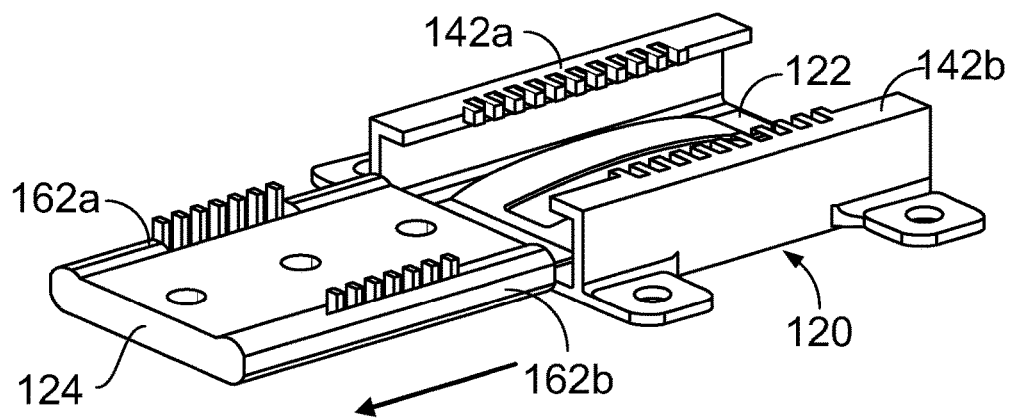
FIG. 9 illustrates an isometric view of the slide plate removed from a mounting base, according to an embodiment of the present disclosure.

FIG. 9 illustrates an isometric view of the slide plate 124 removed from the mounting base 120, according to an embodiment of the present disclosure. Referring to FIGS. 1-9, with continued urging in the direction of arrow 200, such that the adjustment tracks 162 are disengaged from the adjustment tracks 142, the slide plate 124 can be removed from the mounting base 120.

Figure 10:
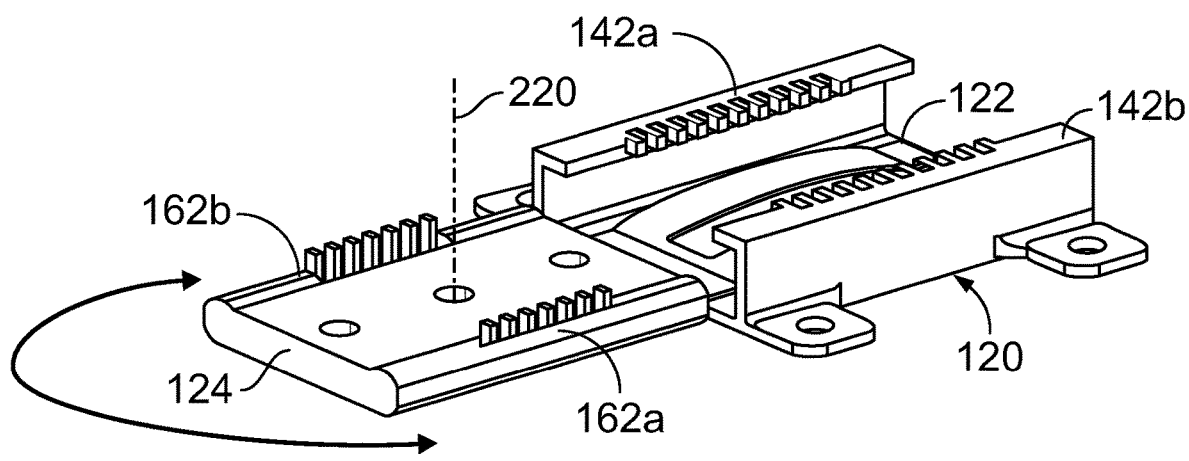
FIG. 10 illustrates an isometric of the slide plate rotated into a different position relative to the mounting base.

FIG. 10 illustrates an isometric of the slide plate 124 rotated into a different position relative to the mounting base 120. Because the adjustment tracks 162a and 162b of the slide plate 124 are offset from one another (and the adjustment tracks 142a and 142b of the mounting base 120 are similarly offset with respect to one another), the slide plate 124 can be rotated 180 degrees about a central axis 220 and reinserted into the mounting base 120 to provide finer tuned adjustment. For example, adjustment of the slide plate 124 relative to the mounting base 120 can be in ⅛ inch steps. The teeth and retainers of the respective adjustment tracks 142 and 162 are offset to provide a 1/16 inch adjustment when the slide plate 124 is rotated 180 degrees, as described. That is, removing and rotating the slide plate provides adjustment in ¹⁄₁₆ inch increments.

As described, in at least one example, the slide plate 124 includes a first (plate) adjustment track 162*a* and a second (plate) adjustment track 162 configured to be selectively secured and unsecured from one or both of a first (base) adjustment track 142*a* and a second (base) adjustment track 142*b* (for example, the mounting base 120 may include just one of the adjustment tracks 142*a* or 142*b*, or may include both). In at least one example, the first adjustment track 162*a* is offset with respect to the second adjustment track 162*b*.

As described with respect to FIGS. 8-10, the slide plate 124 is configured to be removed from the mounting base 120. The slide plate 124 can then be rotated about the central axis 220 to a different radial position relative to the mounting base 120. The slide plate 124 can then be re-inserted into the mounting base 120 at the different radial position.

Figure 11:
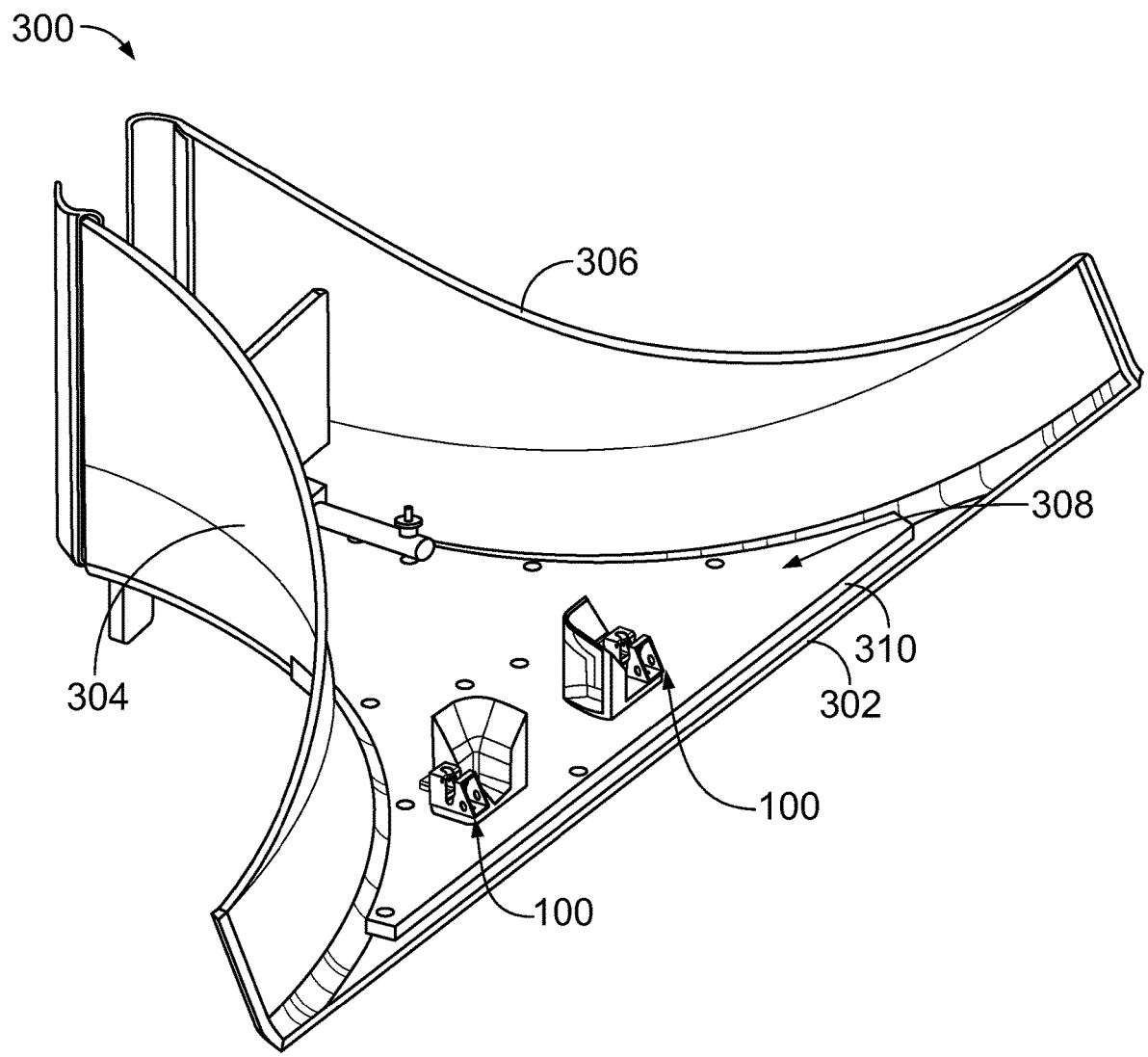
FIG. 11 illustrates an isometric top view of a header assembly, according to an example of the present disclosure.

FIG. 11 illustrates an isometric top view of a header assembly 300, according to an example of the present disclosure. The header assembly 300 is an example of a first component 102 (shown in FIG. 1), or optionally, a second component 104 (shown in FIG. 1). The header assembly 300 is configured to be disposed within an internal cabin of a vehicle, such as a commercial aircraft.

The header assembly 300 includes a base panel 302, and opposed arcuate walls 304 and 306 upwardly extending from the base panel 302. An internal chamber 308 is defined between the base panel 302 and the arcuate walls 304 and 306. An insert sheet 310 is disposed over a portion of the base panel 302. Latch systems 100 are mounted onto the insert sheet 310.

Figure 12:
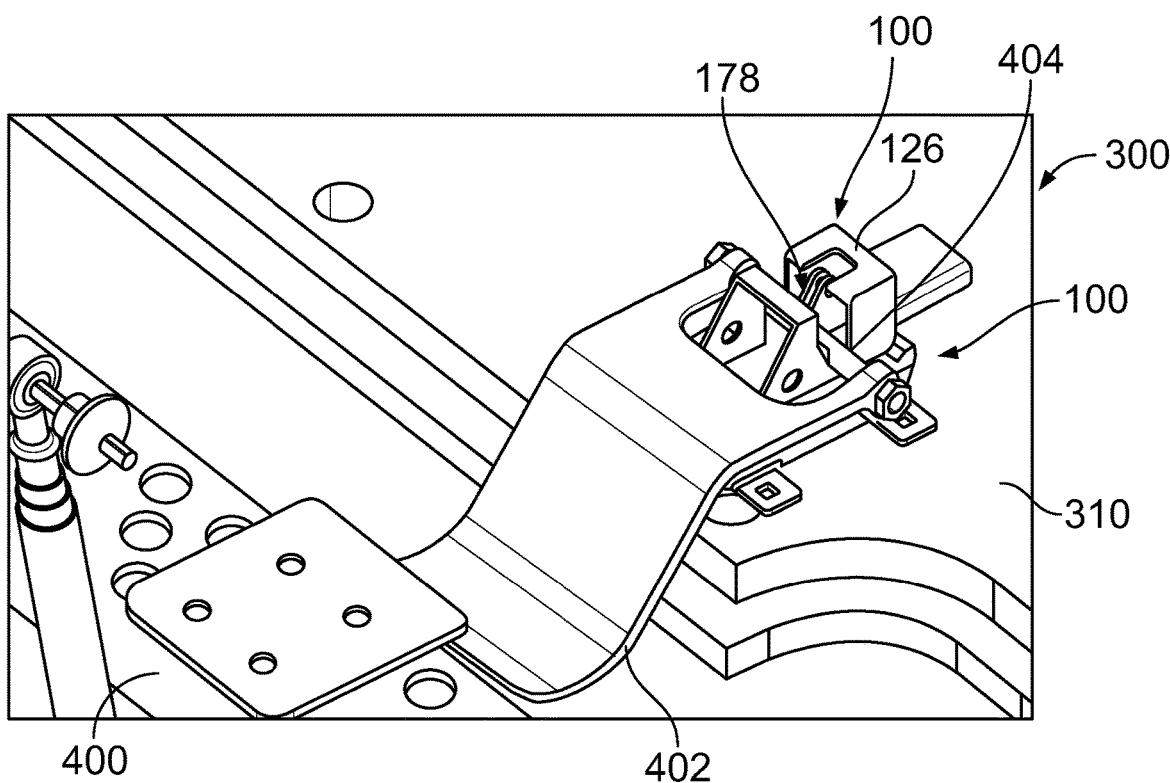
FIG. 12 illustrates an isometric top view of a portion of a bin assembly including a beam having a latch arm securely latched to a latch system of the header assembly, according to an example of the present disclosure.

FIG. 12 illustrates an isometric top view of a portion of a bin assembly 400 including a beam 402 having a latch arm 404 securely latched to a latch system 100 of the header assembly 300, according to an example of the present disclosure. The tie rod 400 is an example of a second component 104 (shown in FIG. 1), or optionally a first component 102 (shown in FIG. 1). The latch arm 404 is securely latched within the arm channel 178 of the housing 126, as described herein.

Figure 13:
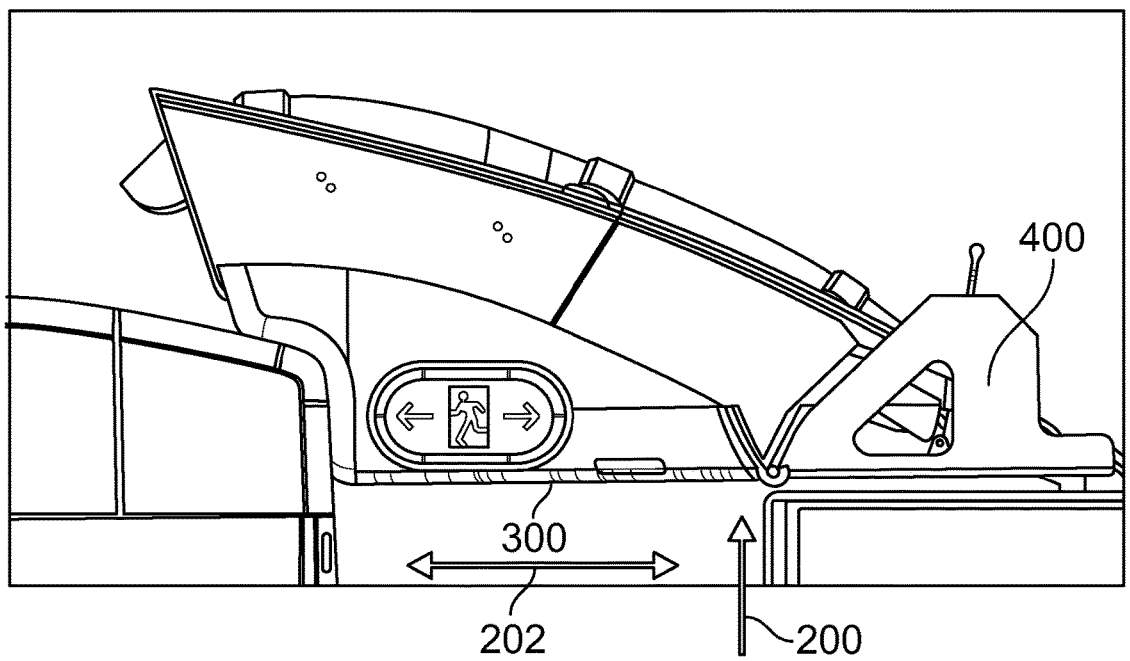
FIG. 13 illustrates a lateral view of the header assembly secured to a portion of a bin assembly, according to an example of the present disclosure.

FIG. 13 illustrates a lateral view of the header assembly 300 secured to the portion of the bin assembly 400, according to an example of the present disclosure. Referring to FIGS. 1-13, the latch system 100 allows the header assembly 300 to be adjusted relative to the portion of the bin assembly 400 without being disconnected therefrom. As described herein, in order to adjust the header assembly 300 relative to the portion 400, the header assembly 300 is urged upwardly in the direction of arrow 200 (such as at an outboard side, or optionally an inboard side), thereby disengaging the adjustment track(s) 162 of the slide plate 124 from the reciprocal adjustment track(s) 142 of the mounting base 120. With the force in the direction of arrow 200 being applied, the header assembly 300 can then be linearly moved in the direction of arrows 202 to a desired position, as described herein.

If adjustment is needed after the header assembly 300 is connected to the portion of the bin assembly 400, an individual can push up on the header assembly 300 proximate to the portion of the bin assembly 400 in the direction of arrow 200, and then slide to an adjusted position in the direction(s) of arrow 202. After the force in the direction of arrow 200 is released, the weight of the header assembly 300 locks it in place relative to the portion 400. The spring member 122 (shown in FIG. 2, for example) reduces vibration between the mounting base 120 and the slide plate 124, and provides constant pressure therebetween to prevent the slide plate 124 from inadvertently moving relative to the mounting base 120 (such as during periods of turbulence during a flight, for example).

Figure 14:
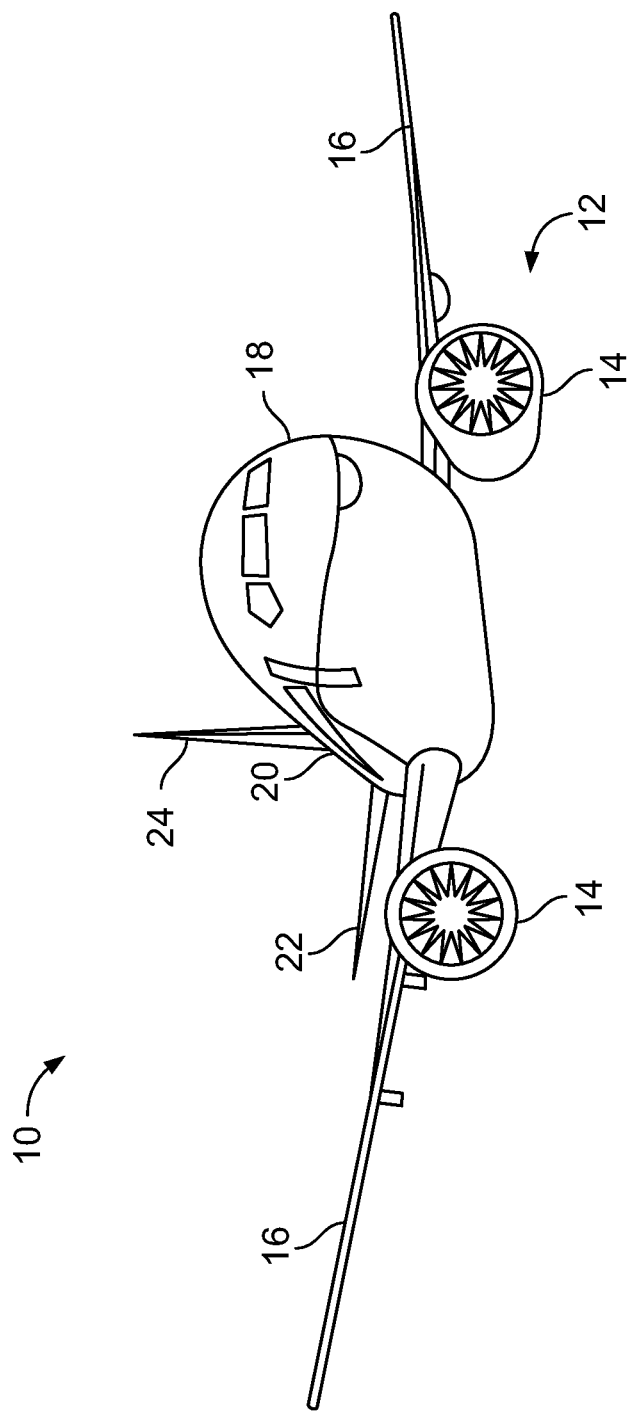
FIG. 14 illustrates an isometric front view of an aircraft, according to an example of the present disclosure.

FIG. 14 illustrates an isometric front view of a vehicle, such as an aircraft 10, according to an embodiment of the present disclosure. The aircraft 10 includes a propulsion system 12 that may include two engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

The internal cabin includes components that can be secured together via the latch system 100, shown and described with respect to FIGS. 1-13. For example, the internal cabin can include header assemblies coupled to other components, such as valences, overhead stowage bin assemblies, monuments, and the like via one or more latch systems 100.

Alternatively, instead of an aircraft, embodiments of the present disclosure may be used with various other vehicles, such as automobiles, buses, locomotives, and train cars, seacraft, spacecraft, and the like.

Figure 15A:
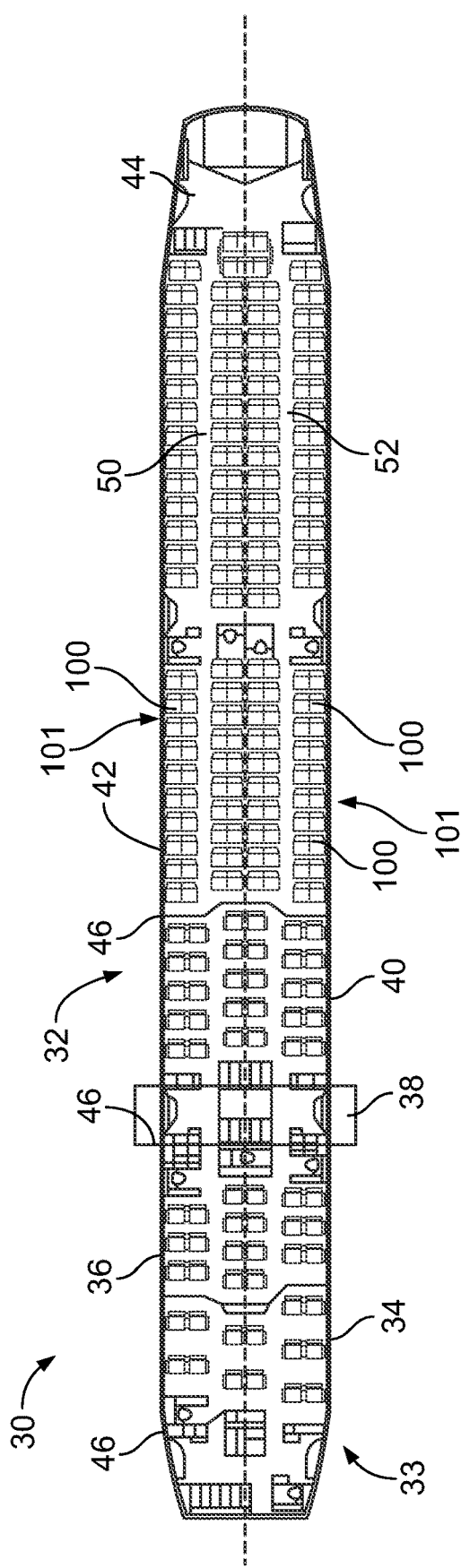
FIG. 15A illustrates a top plan view of an internal cabin of an aircraft.

FIG. 15A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 15A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

The internal cabin 30 shown in FIG. 15A is an example of an internal cabin of the aircraft 10, shown in FIG. 14.

Figure 15B:
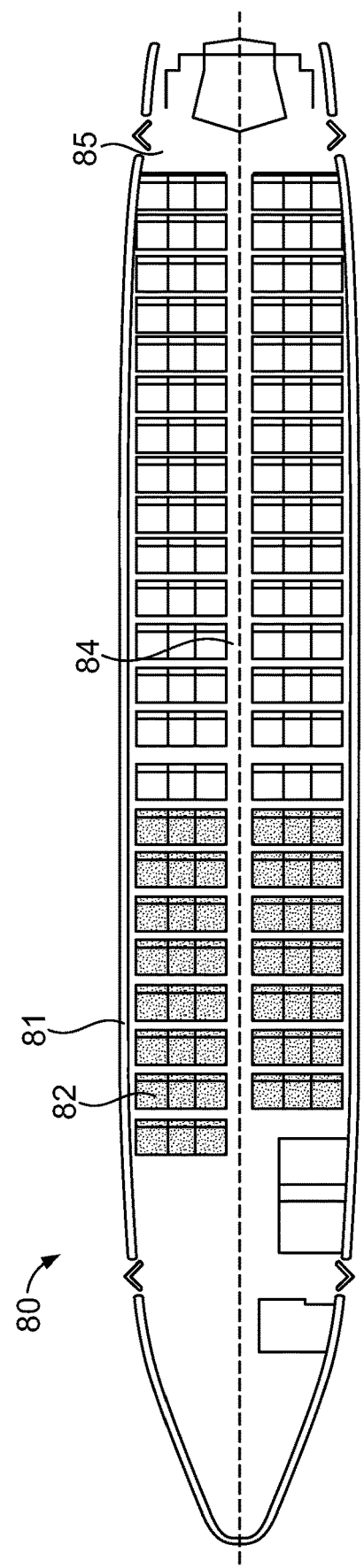
FIG. 15B illustrates a top plan view of an internal cabin of an aircraft.

FIG. 15B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

The internal cabin 30 shown in FIG. 15B is an example of an internal cabin of the aircraft 10, shown in FIG. 14.

Referring to FIGS. 1-15B, the latch system 100 is configured to provide inboard and outboard adjustment of a component, such as a header assembly, relative to another component, such as up to +/−0.5 inches (or optionally more). After the header assembly is installed, an individual is able to move the header assembly in outboard and inboard directions (such as in the directions of arrow 202) without disconnecting and lower the header assembly from the other component.

Figure 16:
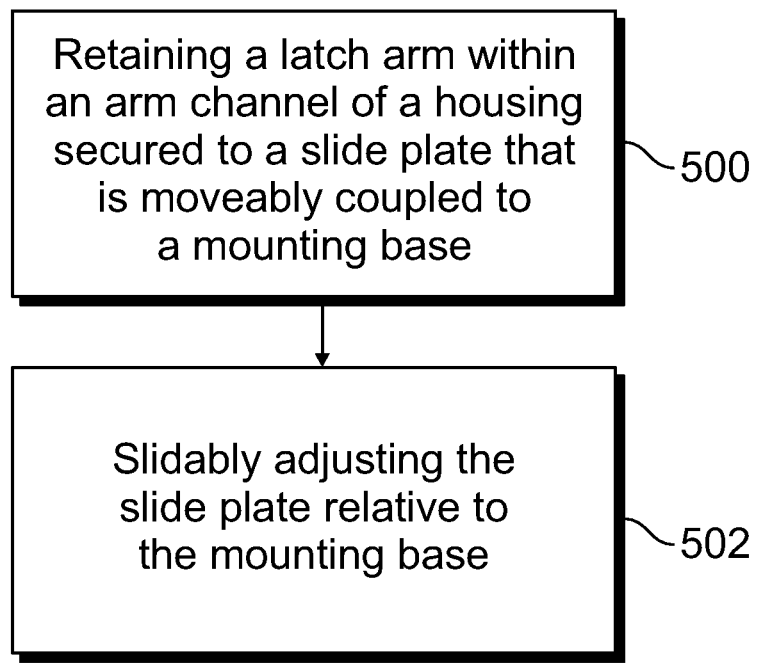
FIG. 16 illustrates a flow chart of a latch method configured to adjustably secure a first component to a second component, according to an example of the present disclosure.

FIG. 16 illustrates a flow chart of a latch method configured to adjustably secure a first component to a second component, according to an example of the present disclosure. Referring to FIGS. 1-16, the latch method includes retaining, at 500, a latch arm 404 within the arm channel 178 of the housing 126 secured to the slide plate 124 that is moveably coupled to the mounting base 120; and slidably adjusting, at 502, the slide plate 124 relative to the mounting base 120.

In at least one example, the first component 102 is a header assembly 300 within an internal cabin of a vehicle. The second component 104 is a structure (such as a portion of a bin assembly) that latchably secures to the header assembly 300 through the latch system 100. The mounting base 120 of the latch system 100 is securely fixed to one of the header assembly 300 or the structure.

In at least one example, the method also includes removably coupling one or more adjustment tracks 162 of the slide plate 124 to one or more reciprocal adjustment tracks 142 of the mounting base 120. For example, a first adjustment track 162a and a second adjustment track 162b removably couple to the one or more reciprocal adjustment tracks 142 of the mounting base 120.

In at least one example, the first adjustment track 162a is offset with respect to the second adjustment track 162b. Further, in at least one example, said removably coupling includes removing the slide plate 124 from the mounting base 120; rotating the slide plate 124 about the axis 220 to a different radial position relative to the mounting base 120; and re-inserting the slide plate 124 into the mounting base 120 at the different radial position.

In at least one example, the latch method also includes exerting, by the spring member 122 disposed between the mounting base 120 and the slide plate 124, a spring force between the mounting base 120 and the slide plate 124.

In at least one example, said slidably adjusting includes urging the mounting base 120 upwardly in relation to the slide plate 124; and sliding the mounting base 120 relative to the slide plate 124 during said urging.

Further, the disclosure comprises examples according to the following clauses:

Clause 1. A latch system configured to adjustably secure a first component to a second component, the latch system comprising:
a mounting base;
a slide plate moveably coupled to the mounting base, wherein the slide plate is configured to be slidably adjusted relative to the mounting base; and
a housing secured to the slide plate, wherein the housing comprises an arm channel configured to receive and retain a latch arm.

Clause 2. The latch system of Clause 1, wherein the first component is a header assembly within an internal cabin of a vehicle, wherein the second component is a structure that latchably secures to the header assembly through the latch system, and wherein the mounting base of the latch system is securely fixed to one of the header assembly or the structure.

Clause 3. The latch system of Clauses 1 or 2, wherein the slide plate comprises one or more adjustment tracks configured to removably couple to one or more reciprocal adjustment tracks of the mounting base.

Clause 4. The latch system of Clause 3, wherein the one or more adjustment tracks of the slide plate comprise a first adjustment track and a second adjustment track configured to removably couple to the one or more reciprocal adjustment tracks of the mounting base.

Clause 5. The latch system of Clause 4, wherein the first adjustment track is offset with respect to the second adjustment track.

Clause 6. The latch system of Clause 5, wherein the slide plate is configured to be removed from the mounting base, rotated about an axis to a different radial position relative to the mounting base, and re-inserted into the mounting base at the different radial position.

Clause 7. The latch system of any of Clauses 1-6, further comprising a spring member disposed between the mounting base and the slide plate, wherein the spring member exerts a spring force between the mounting base and the slide plate.

Clause 8. The latch system of Clause 7, wherein the mounting base comprises an adjustment channel, wherein the slide plate and the spring member are disposed within the adjustment channel.

Clause 9. The latch system of any of Clauses 1-8, further comprising a release lever pivotally coupled to the housing, wherein the release lever is configured to pivot between a securing position, in which the latch arm is securely trapped within the arm channel, and a release position, in which the latch arm is removable from the arm channel.

Clause 10. The latch system of Clause 9, wherein the release lever has a length that is at least 1.5 inches.

Clause 11. The latch system of any of Clauses 1-10, wherein the latch system is configured to be adjusted by urging the mounting base upwardly in relation to the slide plate, and sliding the mounting base in relation to the slide plate while the mounting base is urged upwardly in relation to the slide plate.

Clause 12. A latch method configured to adjustably secure a first component to a second component, the latch method comprising:
retaining a latch arm within an arm channel of a housing secured to a slide plate that is moveably coupled to a mounting base; and
slidably adjusting the slide plate relative to the mounting base.

Clause 13. The latch method of Clause 12, wherein the first component is a header assembly within an internal cabin of a vehicle, wherein the second component is a structure that latchably secures to the header assembly through the latch system, and wherein the mounting base of the latch system is securely fixed to one of the header assembly or the structure.

Clause 14. The latch method of Clauses 12 or 13, further comprising removably coupling one or more adjustment tracks of the slide plate to one or more reciprocal adjustment tracks of the mounting base.

Clause 15. The latch method of Clause 14, wherein the one or more adjustment tracks of the slide plate comprise a first adjustment track and a second adjustment track that removably couple to the one or more reciprocal adjustment tracks of the mounting base.

Clause 16. The latch method of Clause 15, wherein the first adjustment track is offset with respect to the second adjustment track.

Clause 17. The latch method of Clause 16, wherein said removably coupling comprises:
  removing the slide plate from the mounting base;
  rotating the slide plate about an axis to a different radial position relative to the mounting base; and re-inserting the slide plate into the mounting base at the different radial position.

Clause 18. The latch method of any of Clauses 12-17, further comprising exerting, by a spring member disposed between the mounting base and the slide plate, a spring force between the mounting base and the slide plate.

Clause 19. The latch method of any of Clauses 12-18, wherein said slidably adjusting comprises:
  urging the mounting base upwardly in relation to the slide plate; and sliding the mounting base relative to the slide plate during said urging.

Clause 20. A vehicle comprising:
  an internal cabin;
  a first component within the internal cabin;
  a second component within the internal cabin; and
  a latch system that adjustably secures the first component to the second component, the latch system comprising:
    a mounting base including one or more reciprocal adjustment tracks;
    a slide plate moveably coupled to the mounting base, wherein the slide plate is configured to be slidably adjusted relative to the mounting base, wherein the slide plate comprises a first adjustment track and a second adjustment track configured to removably couple to the one or more reciprocal adjustment tracks of the mounting base, wherein the first adjustment track is offset with respect to the second adjustment track, and wherein the slide plate is configured to be removed from the mounting base, rotated about an axis to a different radial position relative to the mounting base, and re-inserted into the mounting base at the different radial position;
    a spring member disposed between the mounting base and the slide plate, wherein the spring member exerts a spring force between the mounting base and the slide plate;
    a housing secured to the slide plate, wherein the housing comprises an arm channel configured to receive and retain a latch arm; and
    a release lever pivotally coupled to the housing, wherein the release lever is configured to pivot between a securing position, in which the latch arm is securely trapped within the arm channel, and a release position, in which the latch arm is removable from the arm channel.

As described herein, examples of the present disclosure provide latch systems and method that allow for adjustment of components after they are connected together. The latch systems and methods allow an individual to adjust a header assembly without removing the header assembly from another component, or preforming additional rework.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A latch system configured to adjustably secure a first component to a second component, the latch system comprising:
  a mounting base;

a slide plate moveably coupled to the mounting base, wherein the slide plate is configured to be slidably adjusted relative to the mounting base;
a housing secured to the slide plate, wherein the housing comprises an arm channel configured to receive and retain a latch arm; and
a spring member disposed between the mounting base and the slide plate, wherein the spring member exerts a spring force between the mounting base and the slide plate, and wherein the spring member comprises a cross strap and arcuate legs longitudinally extending from the cross strap,
wherein the latch system is configured to be adjusted by urging the mounting base upwardly in relation to the slide plate, and by sliding the mounting base in relation to the slide plate while the mounting base is urged upwardly in relation to the slide plate.

2. The latch system of claim 1, wherein the first component is an assembly within an internal cabin of a vehicle, wherein the second component is a structure that latchably secures to the assembly through the latch system, and wherein the mounting base of the latch system is securely fixed to one of the assembly or the structure.

3. The latch system of claim 1, wherein the slide plate comprises one or more adjustment tracks configured to removably couple to one or more reciprocal adjustment tracks of the mounting base.

4. The latch system of claim 3, wherein the one or more adjustment tracks of the slide plate comprise a first adjustment track and a second adjustment track configured to removably couple to the one or more reciprocal adjustment tracks of the mounting base.

5. The latch system of claim 4, wherein the first adjustment track is offset with respect to the second adjustment track such that teeth of the first adjustment track are laterally aligned with retainers of the second adjustment track.

6. The latch system of claim 5, wherein the slide plate is configured to be removed from the mounting base, rotated about an axis to a different radial position relative to the mounting base, and re-inserted into the mounting base at the different radial position.

7. The latch system of claim 1, wherein the mounting base comprises an adjustment channel, wherein the slide plate and the spring member are disposed within the adjustment channel.

8. The latch system of claim 1, further comprising a release lever pivotally coupled to the housing, wherein the release lever is configured to pivot between a securing position, in which the latch arm is securely trapped within the arm channel, and a release position, in which the latch arm is removable from the arm channel.

9. The latch system of claim 8, wherein the release lever has a length that is at least 1.5 inches.

10. A latch method configured to adjustably secure an assembly within an internal cabin of a vehicle to a structure that latchably secures to the assembly, the latch method comprising:
retaining a latch arm within an arm channel of a housing secured to a slide plate that is moveably coupled to a mounting base securely fixed to one of the assembly or the structure;
slidably adjusting the slide plate relative to the mounting base; and
exerting, by a spring member disposed between the mounting base and the slide plate, a spring force between the mounting base and the slide plate, wherein the spring member comprises a cross strap and arcuate legs longitudinally extending from the cross strap.

11. The latch method of claim 10, further comprising removably coupling one or more adjustment tracks of the slide plate to one or more reciprocal adjustment tracks of the mounting base.

12. The latch method of claim 11, wherein the one or more adjustment tracks of the slide plate comprise a first adjustment track and a second adjustment track that removably couple to the one or more reciprocal adjustment tracks of the mounting base.

13. The latch method of claim 12, wherein the first adjustment track is offset with respect to the second adjustment track such that teeth of the first adjustment track are laterally aligned with retainers of the second adjustment track.

14. The latch method of claim 13, wherein said removably coupling comprises:
removing the slide plate from the mounting base;
rotating the slide plate about an axis to a different radial position relative to the mounting base; and
re-inserting the slide plate into the mounting base at the different radial position.

15. The latch method of claim 10, wherein said slidably adjusting comprises:
urging the mounting base upwardly in relation to the slide plate; and
sliding the mounting base relative to the slide plate during said urging.

16. A vehicle comprising:
an internal cabin;
a first component within the internal cabin;
a second component within the internal cabin; and
a latch system that adjustably secures the first component to the second component, the latch system comprising:
a mounting base including one or more reciprocal adjustment tracks;
a slide plate moveably coupled to the mounting base, wherein the slide plate is configured to be slidably adjusted relative to the mounting base, wherein the slide plate comprises a first adjustment track and a second adjustment track configured to removably couple to the one or more reciprocal adjustment tracks of the mounting base, wherein the first adjustment track is offset with respect to the second adjustment track, and wherein the slide plate is configured to be removed from the mounting base, rotated about an axis to a different radial position relative to the mounting base, and re-inserted into the mounting base at the different radial position;
a spring member disposed between the mounting base and the slide plate, wherein the spring member exerts a spring force between the mounting base and the slide plate;
a housing secured to the slide plate, wherein the housing comprises an arm channel configured to receive and retain a latch arm; and
a release lever pivotally coupled to the housing, wherein the release lever is configured to pivot between a securing position, in which the latch arm is securely trapped within the arm channel, and a release position, in which the latch arm is removable from the arm channel.

17. The latch system of claim 7, wherein the spring member further comprises distal feet connected to the legs, wherein the cross strap and the feet abut against a panel of the mounting base within the adjustment channel, and wherein the legs bow above the panel.

18. The method of claim 10, wherein the spring member further comprises distal feet connected to the legs, wherein the cross strap and the feet abut against a panel of the mounting base within the adjustment channel, and wherein the legs bow above the panel.

19. A latch system configured to adjustably secure an assembly within an internal cabin of a vehicle to a structure that latchably secures to the assembly through the latch system, the latch system comprising:
- a mounting base securely fixed to one of the assembly or the structure;
- a slide plate moveably coupled to the mounting base, wherein the slide plate is configured to be slidably adjusted relative to the mounting base;
- a housing secured to the slide plate, wherein the housing comprises an arm channel configured to receive and retain a latch arm; and
- a spring member disposed between the mounting base and the slide plate, wherein the spring member exerts a spring force between the mounting base and the slide plate, and wherein the spring member comprises a cross strap and arcuate legs longitudinally extending from the cross strap.

20. A latch system configured to adjustably secure a first component to a second component, the latch system comprising:
- a mounting base;
- a slide plate moveably coupled to the mounting base, wherein the slide plate is configured to be slidably adjusted relative to the mounting base;
- a housing secured to the slide plate, wherein the housing comprises an arm channel configured to receive and retain a latch arm;
- a release lever pivotally coupled to the housing, wherein the release lever is configured to pivot between a securing position, in which the latch arm is securely trapped within the arm channel, and a release position, in which the latch arm is removable from the arm channel; and
- a spring member disposed between the mounting base and the slide plate, wherein the spring member exerts a spring force between the mounting base and the slide plate, and wherein the spring member comprises a cross strap and arcuate legs longitudinally extending from the cross strap.

21. The latch system of claim 20, wherein the release lever has a length that is at least 1.5 inches.

\* \* \* \* \*